United States Patent
Michael et al.

(10) Patent No.: US 7,440,505 B2
(45) Date of Patent: Oct. 21, 2008

(54) WIRELESS IMPULSE TRANSMITTER, RECEIVER, AND METHOD

(75) Inventors: Lachlan Michael, Saitama (JP);
Mohammad Ghavami, Tokyo (JP);
Ryuji Kohno, Tokyo (JP)

(73) Assignee: Sony Corporation, Tokyo (JP)

( * ) Notice: Subject to any disclaimer, the term of this patent is extended or adjusted under 35 U.S.C. 154(b) by 983 days.

(21) Appl. No.: 10/200,953

(22) Filed: Jul. 22, 2002

(65) Prior Publication Data
US 2003/0128772 A1 Jul. 10, 2003

(30) Foreign Application Priority Data
Jul. 23, 2001 (JP) ............................. 2001-221334

(51) Int. Cl.
*H04L 27/00* (2006.01)

(52) U.S. Cl. .................................... 375/259

(58) Field of Classification Search ................ 375/295, 375/316, 260, 259; 455/500, 130; 370/464
See application file for complete search history.

(56) References Cited

U.S. PATENT DOCUMENTS

| | | | | |
|---|---|---|---|---|
| 3,908,084 A * | 9/1975 | Wiley | .......................... | 375/373 |
| 4,542,504 A * | 9/1985 | Moul et al. | .................. | 370/517 |
| 4,759,040 A * | 7/1988 | Kawata et al. | .............. | 375/368 |
| 5,253,272 A * | 10/1993 | Jaeger et al. | ................. | 375/296 |
| 5,335,293 A * | 8/1994 | Vannelli et al. | ............. | 382/110 |
| 5,471,673 A * | 11/1995 | Palmer | ....................... | 455/260 |
| 5,621,425 A * | 4/1997 | Hoshino et al. | ................ | 345/94 |
| 5,790,516 A * | 8/1998 | Gudmundson et al. | ....... | 370/210 |
| 6,134,215 A * | 10/2000 | Agrawal et al. | ............. | 370/209 |
| 6,269,075 B1 * | 7/2001 | Tran | ........................... | 370/206 |
| 6,275,679 B1 * | 8/2001 | Elam et al. | ................. | 455/26.1 |
| 6,354,946 B1 * | 3/2002 | Finn | ............................. | 463/40 |
| 6,359,874 B1 * | 3/2002 | Dent | .......................... | 370/342 |
| 6,549,567 B1 * | 4/2003 | Fullerton | ..................... | 375/219 |
| 6,680,727 B2 * | 1/2004 | Butler et al. | ................. | 375/144 |
| 6,807,145 B1 * | 10/2004 | Weerackody et al. | ........ | 370/203 |
| 6,937,667 B1 * | 8/2005 | Fullerton et al. | ............ | 375/295 |
| 7,076,168 B1 | 7/2006 | Shattil | | |
| 2002/0018514 A1 * | 2/2002 | Haynes et al. | .............. | 375/130 |
| 2002/0080889 A1 * | 6/2002 | Dress et al. | ................. | 375/295 |
| 2003/0035466 A1 * | 2/2003 | Proctor et al. | ............... | 375/146 |
| 2003/0147655 A1 * | 8/2003 | Shattil | ........................ | 398/182 |

\* cited by examiner

*Primary Examiner*—Mohammad Ghayour
*Assistant Examiner*—Vineeta S Panwalkar
(74) *Attorney, Agent, or Firm*—Finnegan, Henderson, Farabow, Garrett & Dunner, L.L.P.

(57) ABSTRACT

A wireless impulse transmitter that is for transmitting pulse trains to a plurality of receivers, includes a pulse selector, a pulse supplier, and a transmission unit. The pulse selector is for selecting, from a plurality of orthogonal pulse shapes assigned in a two-to-one correspondence with the receivers, pulse shapes corresponding to symbols of an input data stream. Each of the two pulse shapes assigned to each receiver represents either one or zero to the corresponding receiver. The pulse supplier is for supplying pulses in pulse shapes selected by the pulse selector. The transmission unit is for transmitting the pulses supplied from the pulse supplier in pulse trains, wherein pulses with pulse shapes assigned to different receivers are transmitted simultaneously.

10 Claims, 12 Drawing Sheets

WIRELESS IMPULSE TRANSMITTER, RECEIVER, AND METHOD

BACKGROUND OF THE INVENTION

1. Field of the Invention

The present invention relates to a wireless impulse transmitter, receiver, and method.

2. Description of the Related Art

Typical digital communication is performed by transmitting an analog waveform, which represents message symbols, through a channel. Ultra-wide band (UWB) communication is performed by transmitting and detecting pulse trains. The pulses have widths of less than 1 ns and bandwidth up to or beyond 3 GHz. Ultra-wide band systems are well suited for short range, fully mobile, wireless communication in a dense multipath and perhaps shadowed environment. When a base station is to send data to more than one remote receiver, the base station must transmit different pulse trains in a manner that enables the remote receivers to receive only the corresponding pulse train. For example, the base station can modulate the base pulses, known as monocycles, in time using pulse-position modulation (PPM) to encode each pulse train in a manner readable only by a receiver that is assigned the same code.

SUMMARY OF THE INVENTION

However, all conventional methods for enabling distinction between different pulse trains require that the multi-user base station send data serially, that is, one pulse after another. Otherwise, interference between pulses will make it impossible for proper reception at the remote receivers. Therefore, the encoding schemes become more complicated as the number of remote receivers increases, so that the data rate per user decreases.

It is an objective of the present invention to provide a wireless impulse system that enables increasing the number of users without reducing the communication rates.

In order to achieve the above-described objectives, a wireless impulse transmitter according to the present invention is for transmitting pulse trains to a plurality of receivers. Each receiver is assigned two of a plurality of orthogonal pulse shapes. Each of the two pulse shapes assigned to each receiver represents either one or zero to the corresponding receiver. The inventive transmitter includes a pulse selector, a pulse supplier, and a transmission unit. The pulse selector is for selecting, from the plurality of orthogonal pulse shapes, pulse shapes corresponding to symbols of an input data stream. The pulse supplier is for supplying pulses in pulse shapes selected by the pulse selector. The transmission unit is for transmitting the pulses supplied from the pulse supplier in pulse trains, wherein pulses with pulse shapes assigned to different receivers are transmitted simultaneously.

Because the pulses selected by the pulse selector and supplied by the pulse supplier are orthogonal, multiple pulses can be transmitted and received at the same time without causing interference. As a result, the number of user receivers can be increased without a decrease in the bit rate of the channel.

Two real-valued functions $g_m(t)$ and $g_n(t)$, which are defined on an interval $a \leq x \leq b$, are orthogonal if:

$$(g_m \cdot g_n) = \&\int_a^b g_m(t)g_n(t)dt = 0; \quad m \neq n$$

It is desirable that the pulse supplier supply pulse shapes having the same pulse width. When all of the pulses have the same pulse width and also the frequency band, the transmission process is greatly simplified.

It is desirable that the pulse supplier supply pulse shapes that are based on modified Hermite polynomials. Hermite polynomials are modified to become orthogonal as follows:

$$h_n(t) = e^{-\frac{t^2}{4}} h_{e_n}(t)$$
$$= (-1)^n e^{\frac{t^2}{4}} \frac{d^n}{dt^n}\left(e^{-\frac{t^2}{2}}\right);$$
$$n = 0, 1, 2, \Lambda; \quad -\infty < t < \infty$$

Figure 7:
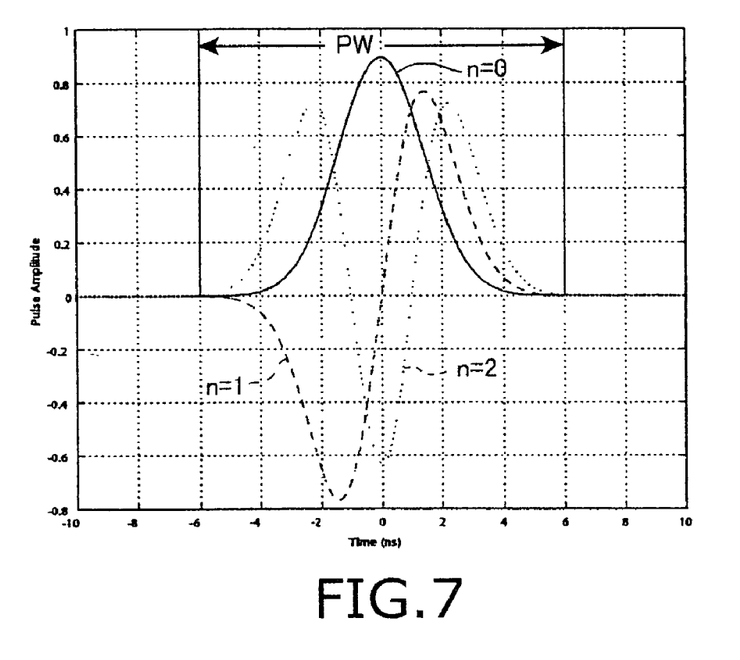
FIG. 7 is a graphical representation showing time response of modified normalized Hermite pulses of order n=0, 1, 2 with a PW=8.
Figure 16:
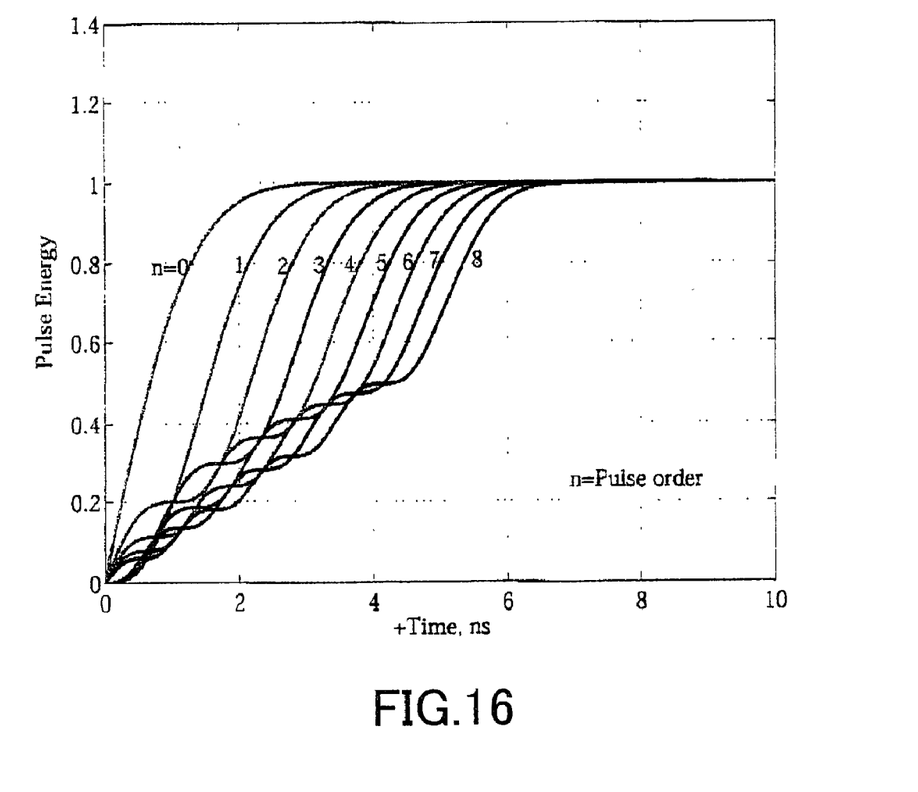
FIG. 16 is a graphical representation showing that 95% of energy of all pulses of FIG. 7 is contained in this pulse duration for pulses of order n=0 . . . 8.

With this configuration, the pulse duration is actually the same for all values of n. That is, the pulses are constrained in time independent of the order of the pulse. In the examples in FIG. 7, the pulse duration is defined as +/−6 ns. As shown in FIG. 16, 95% or more of the energy of all pulses of FIG. 7 is contained in this pulse duration for pulses of order n=0 . . . 8.

There is no limit on the order of the pulses.

Further, the orthogonality of the pulses does not change if they are differentiated. The effect of antennas is often modeled as a differentiation process.

Distance induced attenuation does not significantly increase with the number of levels.

Also, the pulse bandwidth is almost the same regardless of the order of the pulse, that is, for every value of n. This is important in a radio system because containing the pulse width within a certain width contains the frequency within a certain band.

The pulses from order n>0 have zero DC component.

The orthogonality of the pulses is maintained despite differentiating effects of the transmitter and receiver antennas.

The fractional bandwidth can be easily controlled by changing the center frequency. The fractional bandwidth is important when designing wideband antenna arrays, and generally the ratio of the high to low frequencies should be around 2 or 3.

It is desirable that the pulse supplier supplies pulse shapes that are based on modified normalized Hermite polynomials. With this configuration, all the pulses in the transmitted pulse train will have almost the same height and equal energy, so that all the pulses cost the same to transmit.

A wireless impulse receiver according to the present invention includes a receiving unit and a correlator. The receiving unit is for receiving a data stream including pulses that have either of two different orthogonal pulse shapes. The correlator is for distinguishing correspondence between symbols and pulse shapes of the pulses in the data stream received by the receiving unit. The correlator is also for outputting symbols that correspond to the pulse shapes in the received data stream. With this configuration, the same good effects achieved by the inventive transmitter can be achieved.

It is desirable that a synchronizing unit be further provided. The synchronizing unit synchronizes timing of reception at the receiving unit with transmission from a plurality of remote transmitters so as to receive pulses that have mutually orthogonal pulse shapes from the plurality of remote transmitters simultaneously. Because the orthogonal pulses can be received simultaneously, the reception rate of the receiver can be greatly increased.

A method according to the present invention for transmitting pulse trains in a wireless transmission to a plurality of receivers includes selecting, from a plurality of orthogonal pulse shapes assigned in a two-to-one correspondence with the receivers, pulse shapes corresponding to symbols of an input data stream, each of the two pulse shapes assigned to each receiver representing either one or zero to the corresponding receiver; supplying pulses in the selected pulse shapes; and transmitting the supplied pulses in pulse trains wherein pulses with pulse shapes assigned to different receivers are transmitted simultaneously. With this method, the same good effects achieved by the inventive transmitter and receiver can be achieved.

BRIEF DESCRIPTION OF THE DRAWINGS

The above and other objects, features and advantages of the invention will become more apparent from reading the following description of the embodiment taken in connection with the accompanying drawings in which.

DETAILED DESCRIPTION OF THE EMBODIMENTS

Next, ultra-wide band (UWB) communication systems according to embodiments of the present invention will be described while referring to the attached drawings. According to the present invention, an ultra-wide band communication system is a system with a fractional bandwidth $B_f$ of greater than 25%. Fractional bandwidth $B_f$ is defined as:

$$B_f = \frac{B}{f_c} = \frac{f_h - f_l}{(f_h + f_l)/2} \times 100\% \tag{1}$$

wherein B is the signal bandwidth;

$f_c$ is center frequency;

$f_h$ is the higher 3 dB points of the signal spectrum; and $f_l$ is the lower 3 dB points of the signal spectrum.

Figure 1:
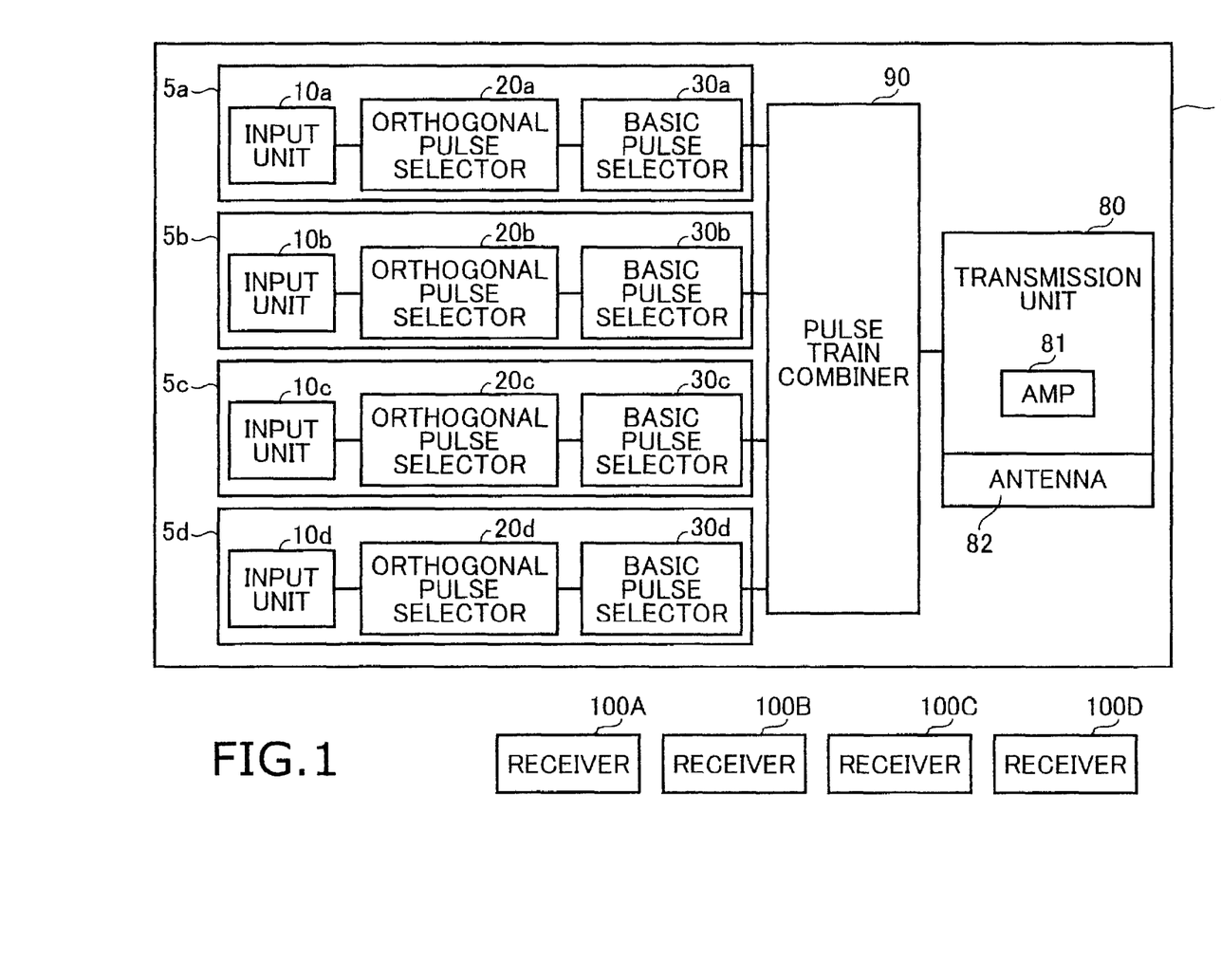
FIG. 1 is a block diagram showing outline of the ultra-wide band system according to a first embodiment of the present invention.

An ultra-wide band communication system according to a first embodiment will be described with reference to FIGS. 1 to 4. As shown in FIG. 1, the system of the first embodiment includes a wireless ultra-wide band impulse transmitter 1 and four remote receivers 100A to 100D. In this embodiment, the transmitter 1 is a multi-user base station and the receivers 100A to 100D are mobile terminals. The transmitter 1 is capable of transmitting eight different pulse shapes that are mutually orthogonal. The eight pulse shapes are represented by symbol numbers 1 to 8. Each of the receivers 100A to 100D is assigned two of the eight pulse shapes (symbol numbers) to represent a binary channel, that is, 0 or 1. In this example, the receiver 100A is assigned symbol numbers 1 and 2, the receiver 100B is assigned symbol numbers 3 and 4, the receiver 100C is assigned symbol numbers 5 and 6, and the receiver 100D is assigned symbol numbers 7 and 8. This correspondence relationship is summarized as follows:

| Receiver | Binary Data | Symbol Number |
| --- | --- | --- |
| 100A | 0 | 1 |
| 100A | 1 | 2 |
| 100B | 0 | 3 |
| 100B | 1 | 4 |
| 100C | 0 | 5 |
| 100C | 1 | 6 |
| 100D | 0 | 7 |
| 100D | 1 | 8 |

The transmitter 1 includes pulse train generators 5a to 5d in a one-to-one correspondence with the receivers 100A to 100D. The transmitter 1 also includes a pulse combiner 90 connected to the basic pulse selectors 30a to 30d and a transmission unit 80 connected to the pulse combiner 90.

Figure 2:
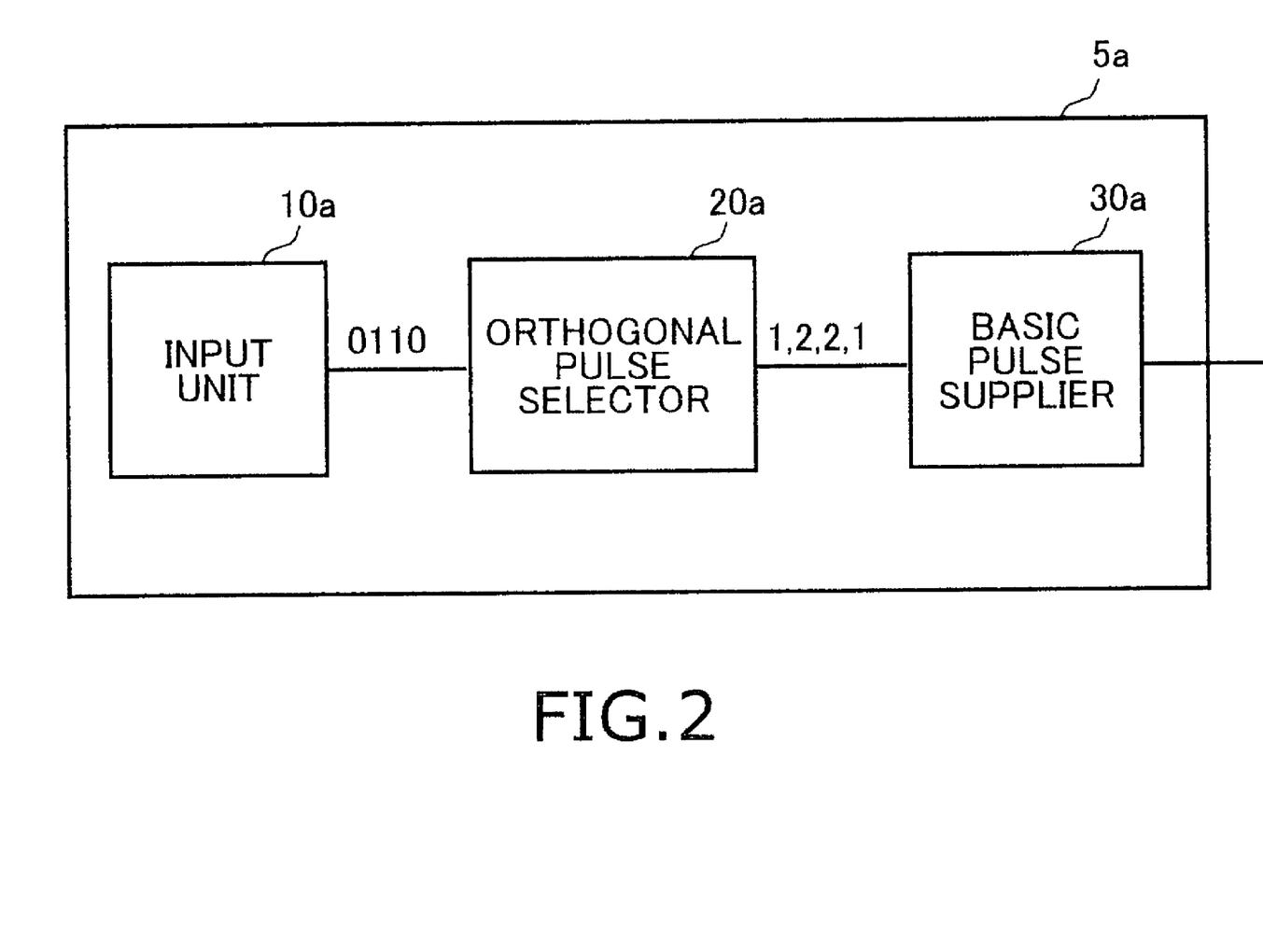
FIG. 2 is a block diagram showing configuration of a pulse train generator of a transmitter in the system of FIG. 1.

Each pulse train generator 5a to 5d has substantially the same configuration, so the configuration of pulse train generator 5a will be provided as a representative example. As shown in FIG. 2, the pulse train generator 5a includes an input unit 10a, an orthogonal pulse selector 20a, and a pulse selector 30a. The orthogonal pulse selector 20a determines which symbols correspond to which bits in a binary data stream received from the input unit 10a, and outputs the symbol numbers to the basic pulse supplier 30a. In the example of FIG. 2, the input unit 10a provides bits 0110 in a data stream to the orthogonal pulse selector 20a, which outputs the corresponding symbol numbers 1,2,2,1 to the basic pulse supplier 30a accordingly. The orthogonal pulse selector 20a outputs the symbol numbers in the form of a value determined by multiplying a function (n+½) times a gain $$\left(\sqrt{n!\sqrt{\pi/2}}\right),$$

which is for normalizing the pulse amplitude, wherein n is the order of the pulse, that is, 1 or 2 in this example.

The basic pulse supplier 30a generates an analog pulse shape according to the selection from the orthogonal pulse selector 20a. That is, the basic pulse supplier 30a generates a set of different pulse shapes that correspond to the input symbol numbers. The different pulse shapes are orthogonal to each other and have substantially the same pulse width. According to the present embodiment, the basic pulse supplier 30a supplies pulse shapes based on modified normalized Hermite polynomials, which are orthogonal as described below.

Hermite polynomials are expressed by the following equation:

$$h_{e_0}(t) = 1; \quad h_{e_n}(t) = (-1)^n e^{\frac{t^2}{2}} \frac{d^n}{dt^n}\left(e^{-\frac{t^2}{2}}\right) \quad (2)$$

where n=1,2, ... and $-\infty < t < \infty$. The following are examples Hermite polynomials:

$$h_{e_1}(t)=t; h_{e_2}(t)=t^2-1; h_{e_3}(t)=t^3-3t; h_{e_4}(t)=t^4-6t^2+3$$

$$h_{e_5}(t)=t^5-10t^3+15t; h_{e_6}(t)=t^6-15t^4+45t^2-15 \quad (3)$$

which are related by the following equations $$h_{e_{n+1}}(t) = th_{e_n}(t) - h_{e_n}{}^\&(t) \quad (4)$$

$$h_{e_n}{}^\&(t) = nh_{e_{n-1}}(t) \quad (5)$$

where $h^\&$ stands for derivative of h. The following is a differential equation satisfied by Hermite polynomials, as derived using equations (4) and (5):

$$h_{e_n}{}^{\&\&} - th_{e_n}{}^\& + nh_{e_n} = 0 \quad (6)$$

Hermite polynomials are not orthogonal. By definition, two real-valued functions $g_m(t)$ and $g_n(t)$, which are defined on an interval $a \leq x \leq b$, are orthogonal if:

$$(g_m \cdot g_n) = \&\int_a^b g_m(t)g_n(t)dt = 0; m \neq n \quad (7)$$

A set of real valued functions $g_1(t), g_2(t), g_3(t), \ldots$ is called an orthogonal set of functions in the set. The nonnegative square root of $(g_m \cdot g_m)$ is called the norm of $g_m(t)$ and is denoted by $\|g_m\|$; thus:

$$\|g_m\| = \sqrt{(g_m \cdot g_m)} = \sqrt{\int_a^b g_m^2(t)dt} \quad (8)$$

Orthonormal set of functions satisfy $\|g_m\|$ for every value of m.

Hermite polynomials are modified to become orthogonal as follows:

$$h_n(t) = e^{-\frac{t^2}{4}} h_{e_n}(t) \quad (9)$$

-continued
$$= (-1)^n e^{\frac{t^2}{4}} \frac{d^n}{dt^n}\left(e^{-\frac{t^2}{2}}\right);$$

$n = 0, 1, 2, \Lambda; -\infty < t < \infty$

It can be shown that modified Hermite polynomials (MHP) satisfy the following differential equations $$h\&\&_n + \left(n + \frac{1}{2} - \frac{1}{4}t^2\right)h_n = 0 \quad (10)$$

$$h\&_n + \frac{t}{2}h_n = nh_{n-1} \quad (11)$$

$$h_{n+1} = \frac{t}{2}h_n - h\&_n \quad (12)$$

Denoting the Fourier transform of $h_n(t)$ as $H_n(f)$, equations (10), (11), and (12) can be written as:

$$H\&\&_n + 16\pi^2\left(n + \frac{1}{2} - 4\pi^2 f^2\right)H_n = 0 \quad (13)$$

$$j8\pi^2 fH_n + jH\&_n = 4\pi nH_{n-1} \quad (14)$$

$$H_{n+1} = j\frac{1}{4\pi} H\&_n - j2\pi f H_n \quad (15)$$

Equations $$h_0(t) = e^{-\frac{t^2}{4}} \text{ and } H_0(f) = 2\sqrt{\pi} e^{-4\pi^2 f^2}$$

are examples for when n=0. From equation (15), the transform of some higher degrees of MHP can be obtained as follows:

$$H_1(f) = (-j4\pi f)2\sqrt{\pi}\, e^{-4\pi^2 f^2} \quad (16)$$

$$H_2(f) = (1 - 16\pi^2 f^2)2\sqrt{\pi}\, e^{-4\pi^2 f^2}$$

$$H_3(f) = (-j12\pi f + j64\pi^3 f^3)2\sqrt{\pi}\, e^{-4\pi^2 f^2}$$

and so on.

For gaining added flexibility in the frequency domain, the time functions are multiplied and modified by an arbitrary phase shifted sinusoid. Hence the modulated and modified normalized Hermite polynomials (MMNHP) are defined as follows:

$$p_n(t) = \frac{1}{\sqrt{n!\sqrt{\pi/2}}} h_n(t)\sin(2\pi f_c t + \phi_r) \quad (17)$$

where n=0, 1, 2, ... and $-\infty < t <$ infinity and $\emptyset_r$ is an arbitrary phase that can be zero as well.

Pulses based on modified normalized Hermite polynomial functions have the following properties:

1. The pulse duration is actually the same for all values of n.

2. The pulse bandwidth is almost the same for every value of n. This is important in a radio system because containing the pulse width within a certain width range contains the frequency within a certain band.

3. The fractional bandwidth can be easily controlled by the center frequency $f_c$.

4. The pulses are mutually orthogonal.

5. The pulses have zero DC component.

6. The orthogonality of the pulses is maintained despite differentiating effects of the transmitter and receiver antennas.

Figure 3:
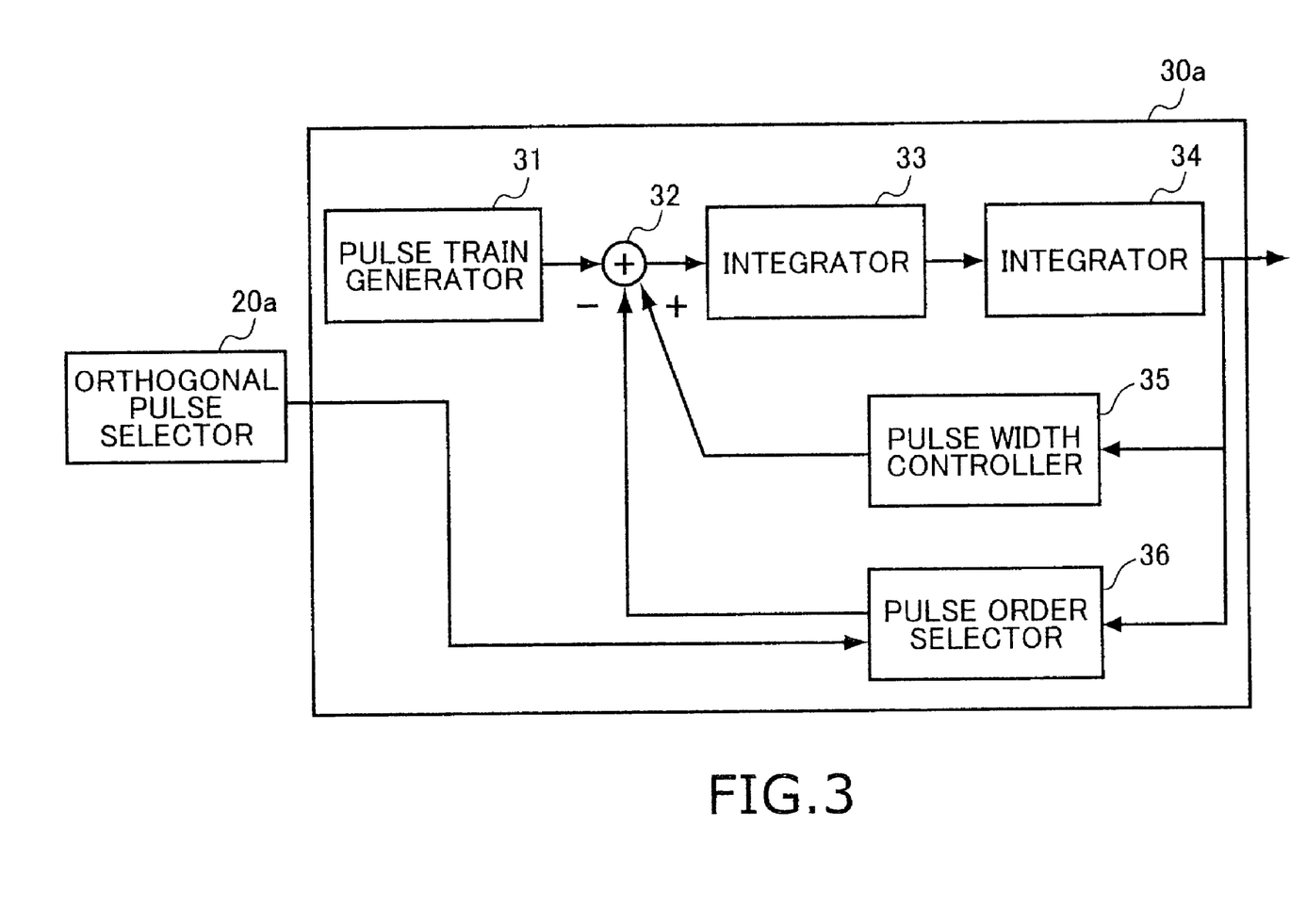
FIG. 3 is a block diagram showing configuration of a basic pulse supplier of the pulse train generator of FIG. 2.
Figure 4:
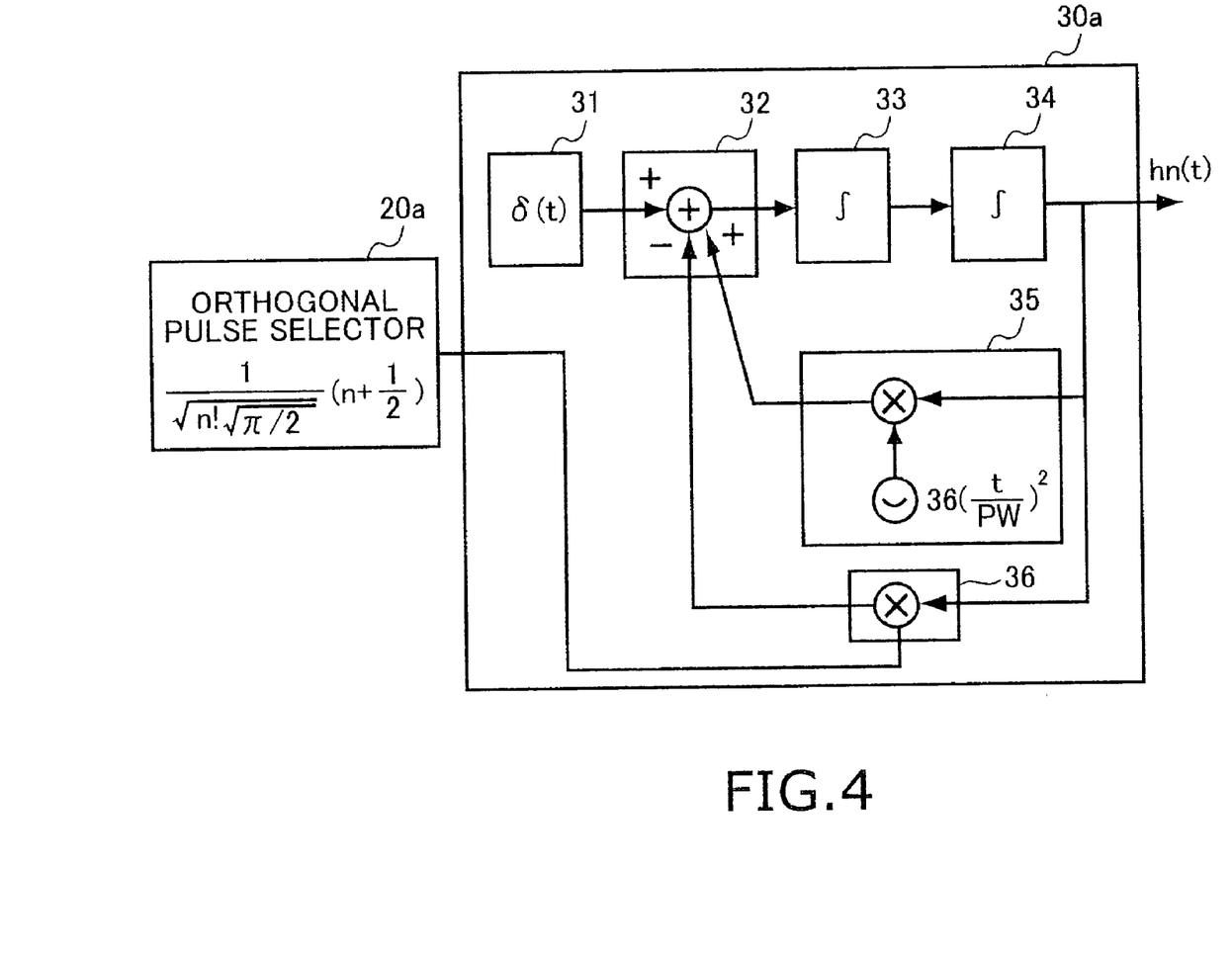
FIG. 4 is a block diagram showing mathematical function of components in the basic pulse supplier of FIG. 3.

As shown in FIGS. 3 and 4, the basic pulse supplier 30a includes a pulse train generator 31, an adder 32, two integrators 33, 34, a pulse width controller 35, and a pulse order selector 36. FIG. 4 shows the mathematical function of each component of the basic pulse supplier 30a.

The pulse train generator 31 is the basic input of pulses and provides a pulse repetition factor (PRF) that indicates the basic time unit between pulses. According to the present embodiment, the pulse train is a pseudo-noise (PN) sequence of pulses, so specific frequency spikes due to a regular pulse train can be avoided.

The pulse width controller 35 is a $t^2$ mono-stable generator with gain G:

$$G = 16\left(\frac{t}{PW}\right)^2$$

where PW is pulse width; and
t is time.

The gain G is multiplied with the signal from the integrator 34. The gain G is important because it determines the pulse width PW and also the bandwidth of the pulse.

The pulse order selector 36 determines the order of the pulse according to the input from the orthogonal pulse selector 20a. The pulse order selector 36 multiplies the value from the orthogonal pulse selector 20a with the feedback from the integrator 34. The adder 32 adds the product from the pulse order selector 36 with the output from the pulse width controller 35.

The transmission unit 80 includes a power amplifier 81 and a wide band antenna 82 for actually transmitting, in a wireless transmission, a pulse train of pulses generated by the pulse supplier 30a.

The pulse train combiner 90 then combines the pulse trains from all of the pulse train generators 5a to 5d and the transmission unit 80 transmits them over the wireless channel.

Figure 5:
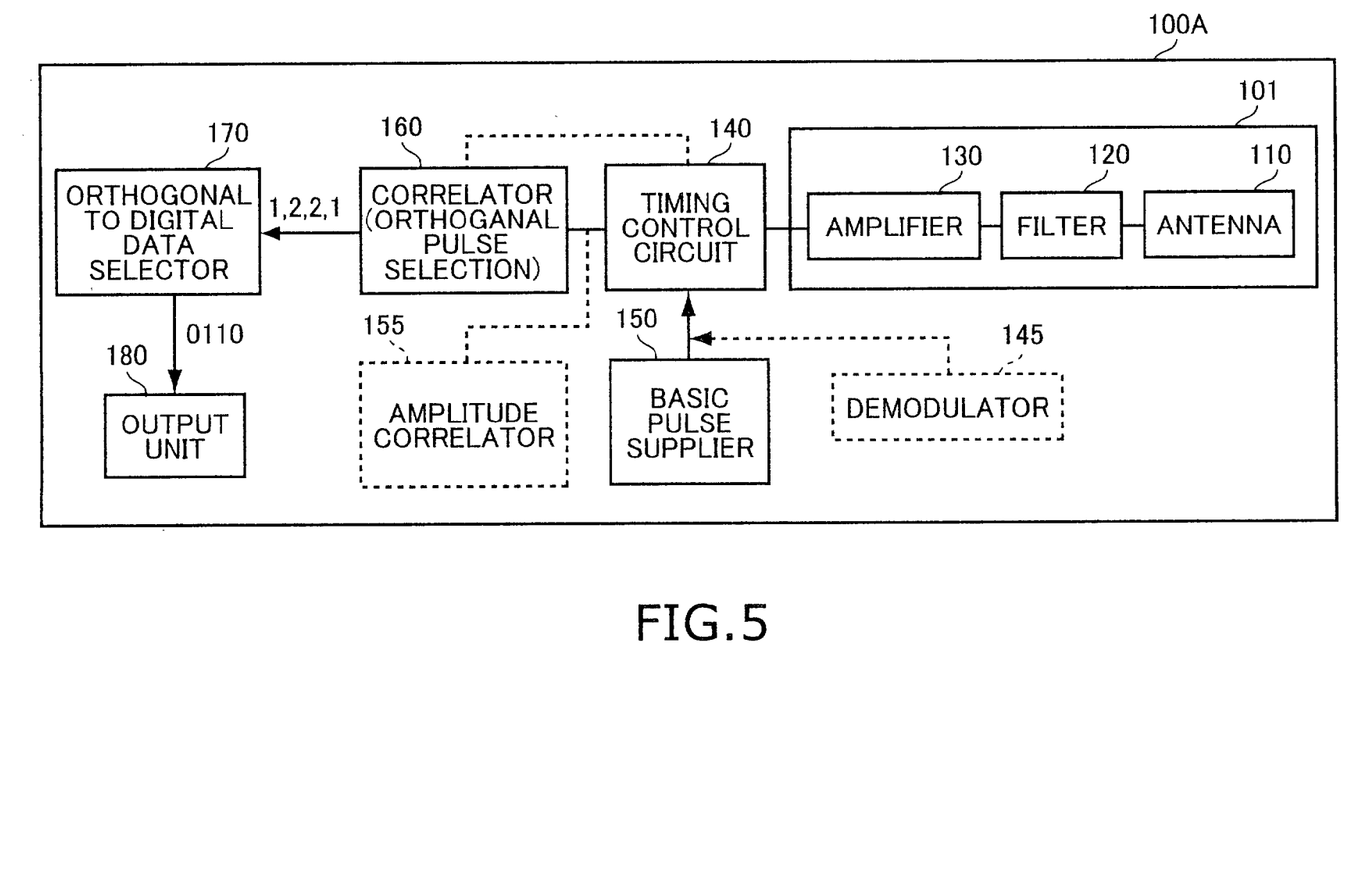
FIG. 5 is a block diagram showing a receiver according to the first embodiment.

Each of the receivers 100A to 100D has substantially same configuration in order to demodulate the incoming signals, with the exception of the two pulse shapes assigned to each. Here, an explanation will be provided for the receiver 100A as a representative example. As shown in FIG. 5, the receiver 100A includes a reception unit 101, a timing control circuit 140, a basic pulse supplier 150, a correlator 160, an orthogonal-to-digital data selector 170, and an output unit 180. The reception unit 101 includes an antenna 110, a filter 120, and an amplifier 130.

After the antenna 110 receives a pulse, the signal is filtered at the filter 120 and amplified at the amplifier 130. The correlator 160 correlates similarity between each incoming pulse and the plurality of orthogonal pulse shapes from the basic pulse supplier 150 to identify the corresponding symbol. Because orthogonal pulses are used, the cross correlation between the pulses is zero. Therefore, the correlator 160 can correctly distinguish among the different pulses. The correlator 160 performs the correlation process at a timing modified by the timing control circuit 140 to allow for differences in time of flight between the transmitter and receiver, for example, when the transmitter, the receiver, or both are moved, and also to allow inclusion of PPM and PN code timing changes.

According to the present embodiment, all of the receivers 100A to 100D have the ability to demodulate all the different orthogonal pulse shapes assigned to the system. This enables implementation of an M-ary modulation scheme when only a portion of the receivers are being used. That is, when only a portion of the receivers are used, the transmitter 1 and operating receivers assign more than two pulse shapes to each of the operating receivers and assign each pulse shape correspondence with multi-bit symbols. For example, when only receivers 100A and 100B are functioning, then the receivers 100A and 100B are allotted four symbol numbers (pulse shapes) each to create a 4-ary modulation scheme in the following manner.

| Receiver | Binary Data | Symbol Number |
|---|---|---|
| 100A | 00 | 1 |
| 100A | 01 | 2 |
| 100A | 10 | 3 |
| 100A | 11 | 4 |
| 100B | 00 | 5 |
| 100B | 01 | 6 |
| 100B | 10 | 7 |
| 100B | 11 | 8 |

Figure 6:
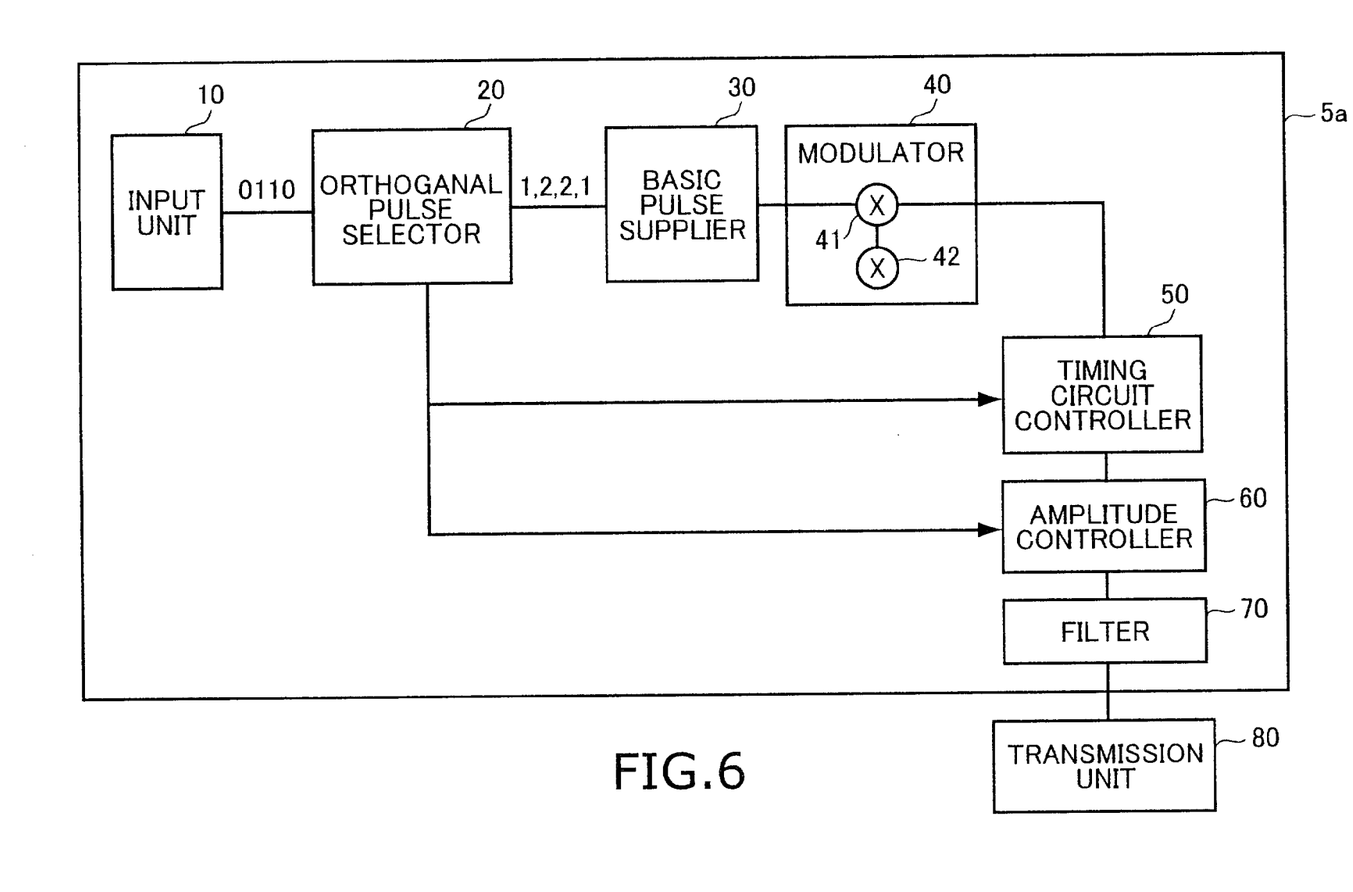
FIG. 6 is a block diagram showing a pulse train generator according to a second embodiment of the present invention.

FIG. 6 shows a pulse train generator 5a' of a transmitter according to a second embodiment. The pulse train generator 5a' includes the input unit 10a, the orthogonal pulse selector 20a, and the basic pulse supplier 30a of the pulse train generator 5a of the first embodiment and further includes a modulator 40, a timing circuit controller 50, an amplitude controller 60, and a filter 70 for enhancing the effects of the system. The modulator 40 includes a mixer 41 and a sine wave generator 42.

The modulator 40 performs sine modulation on the pulse train from the basic pulse supplier 30a so that the pulse bandwidth can be moved into any desired frequency domain. This facilitates complying with governmental regulations or implementing frequency hopping.

The timing circuit controller 50 implements pulse position modulation (PPM) to increase the data rate. The information from the orthogonal pulse selector 20a is used to make the decision about which level or time to choose. In the above-described situation, wherein only the receivers 100A and 100B are functioning, the timing circuit controller 50 applies a 2-pulse position modulation to the 4-ary pulse shape modulation of the orthogonal pulse selector 20a and the basic pulse supplier 30a to encode the data stream in the following way:

| Receiver | Binary Data | Symbol Number | Position |
|---|---|---|---|
| 100A | 000 | 1 | 0 |
| 100A | 001 | 2 | 0 |
| 100A | 010 | 3 | 0 |
| 100A | 011 | 4 | 0 |

-continued

| Receiver | Binary Data | Symbol Number | Position |
|---|---|---|---|
| 100A | 100 | 1 | 1 |
| 100A | 101 | 2 | 1 |
| 100A | 110 | 3 | 1 |
| 100A | 111 | 4 | 1 |
| 100B | 000 | 5 | 0 |
| 100B | 001 | 6 | 0 |
| 100B | 010 | 7 | 0 |
| 100B | 011 | 8 | 0 |
| 100B | 100 | 5 | 1 |
| 100B | 101 | 6 | 1 |
| 100B | 110 | 7 | 1 |
| 100B | 111 | 8 | 1 | where 0 represents one position (a shift backward) and 1 represents another position (a shift forward).

The amplitude controller 60 provides pulse amplitude modulation (PAM). The information from the orthogonal pulse selector 20a is used to make the decision about which level or time to choose.

The filter 70 provides additional reduction of out-of-band noise, depending on transmit power and regulatory requirements.

The receiver for the transmitter of the second embodiment (with the modulator 40) needs a demodulator 145 and an amplitude correlator 155 as indicated in dotted line in FIG. 5.

Figure 8:
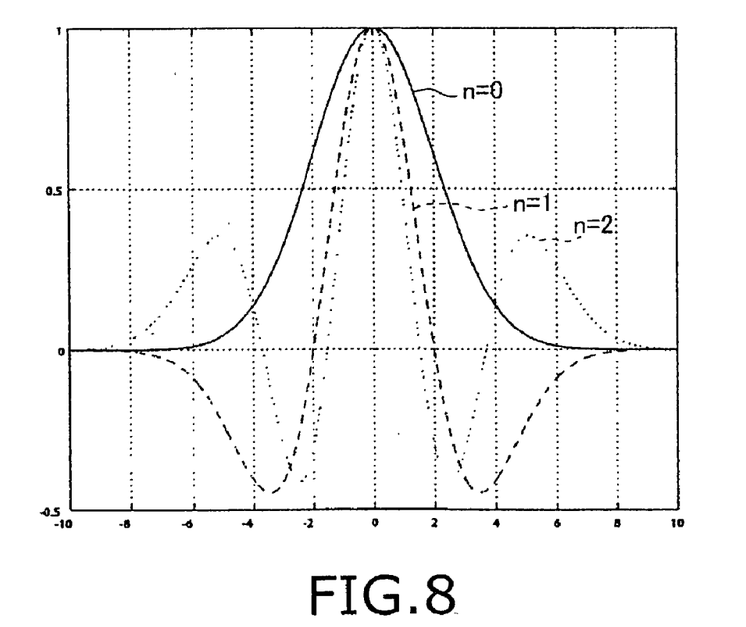
FIG. 8 is a graphical representation showing autocorrelation of normalized Hermite pulses of order n=0, 1, 2 with a PW=8.

FIGS. 7 and 8 show the time domain representations of modified normalized Hermite pulses of order n=1, 2, 3 and the autocorrelations of these pulses.

Figure 9:
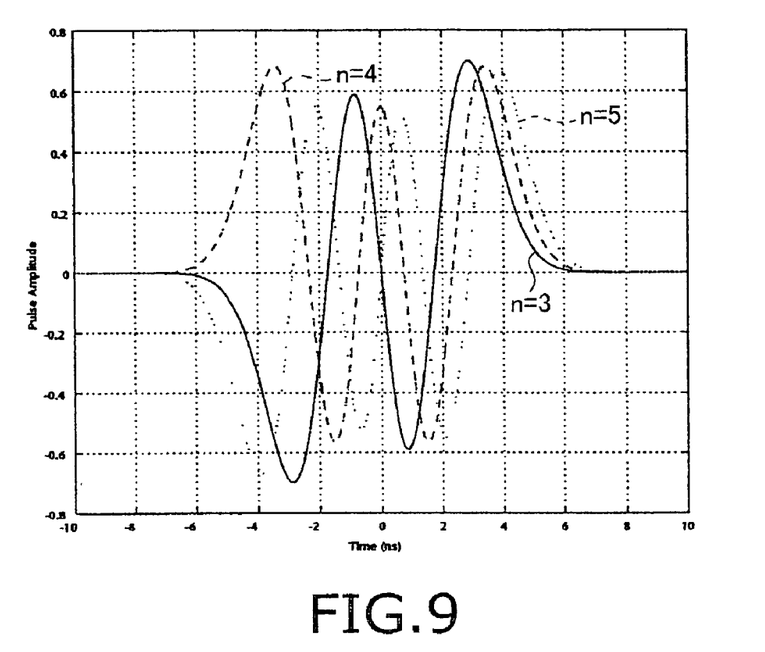
FIG. 9 is a graphical representation of time response of modified normalized Hermite pulses of order n=3, 4, 5 with a PW=8, normalized to unit energy.

FIG. 9 is a graphical representation of time response of modified normalized Hermite pulses of order n=3, 4, 5 with a PW=8, normalized to unit energy.

Figure 10:
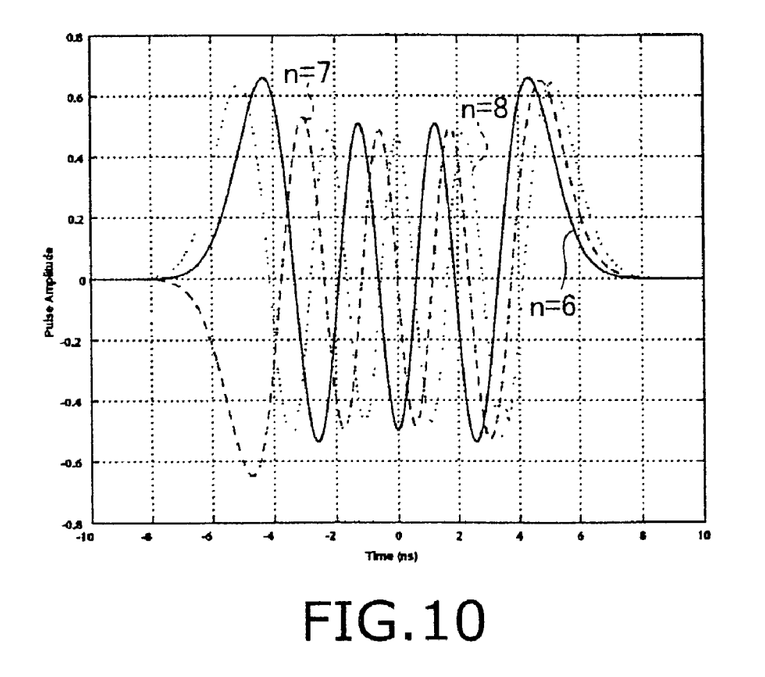
FIG. 10 is a graphical representation of time response of modified Hermite pulses of order n=6, 7, 8 with a PW=8, normalized to unit energy.

FIG. 10 is a graphical representation of time response of modified Hermite pulses of order n=6, 7, 8 with a PW=8, normalized to unit energy.

The inventors performed several simulations to determine effectiveness of the present invention. The results are shown in FIGS. 11 to 14.

Figure 11:
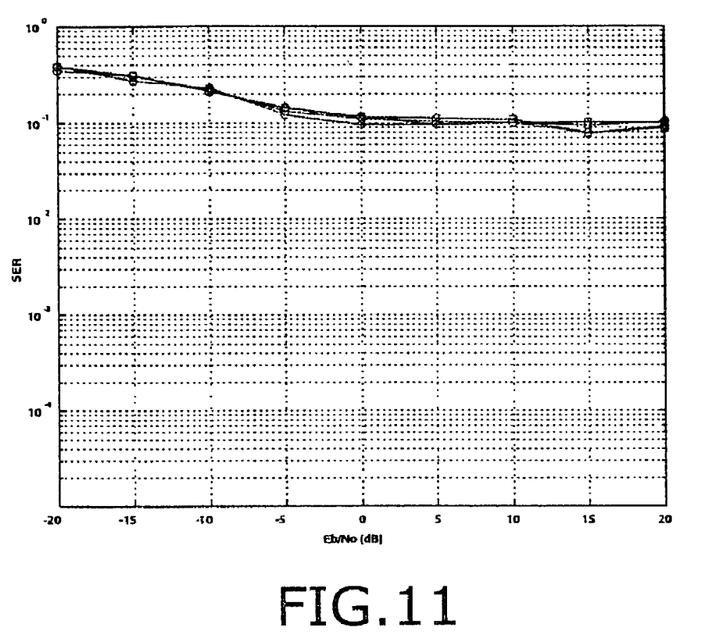
FIG. 11 is a graphical representation of symbol error rate over bit error rate (SER/BER) achieved when two different modified Hermite pulses are used to represent symbols in a digital transmission to a single receiver.

FIG. 11 is a graphical representation of symbol error rate over bit error rate (SER/BER) resulting when two different orthogonal modified Hermite pulses were transmitted to four different users at random times over a time interval of 40 ns. Sometimes the pulses were transmitted close together enough in time to overlap, resulting in interference. When the overlap was too large, a reception error occurred. If can be assumed that an even higher BER would result from the same pulse being transmitted to different users at exactly the same timing, because the pulses would always interfere in this case.

Figure 12:
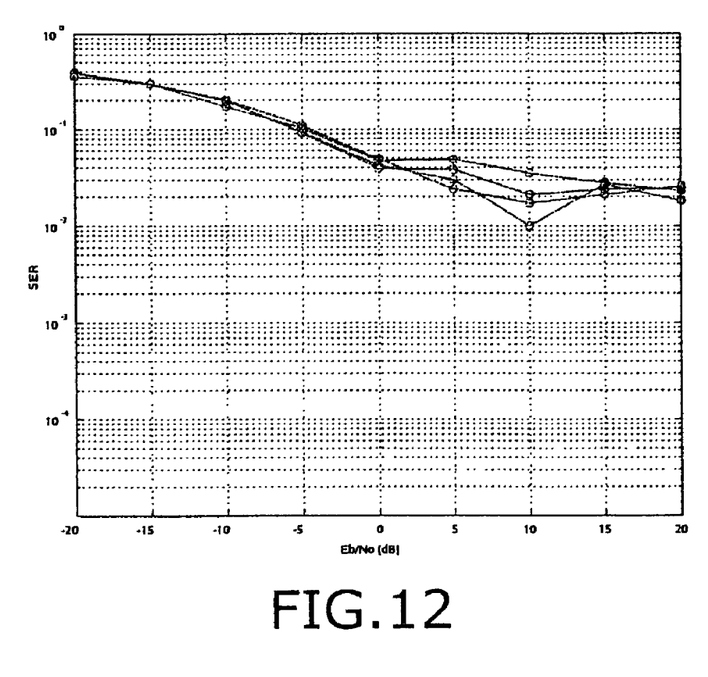
FIG. 12 is graphical representation of symbol error rate achieved when two pulse shapes were transmitted at different times to each of four users at an interval of 40 ns.

FIG. 12 is a graphical representation of symbol error rate resulting when eight different orthogonal modified Hermite pulse shapes were transmitted at random times to four users. Because transmission timing was random, in the same manner as in the example of FIG. 11 sometimes the pulses were transmitted close together enough in time to overlap sufficiently to cause errors. However, because each pulse has a unique shape, the pulses were correctly received more frequently than in the example of FIG. 11.

Figure 13:
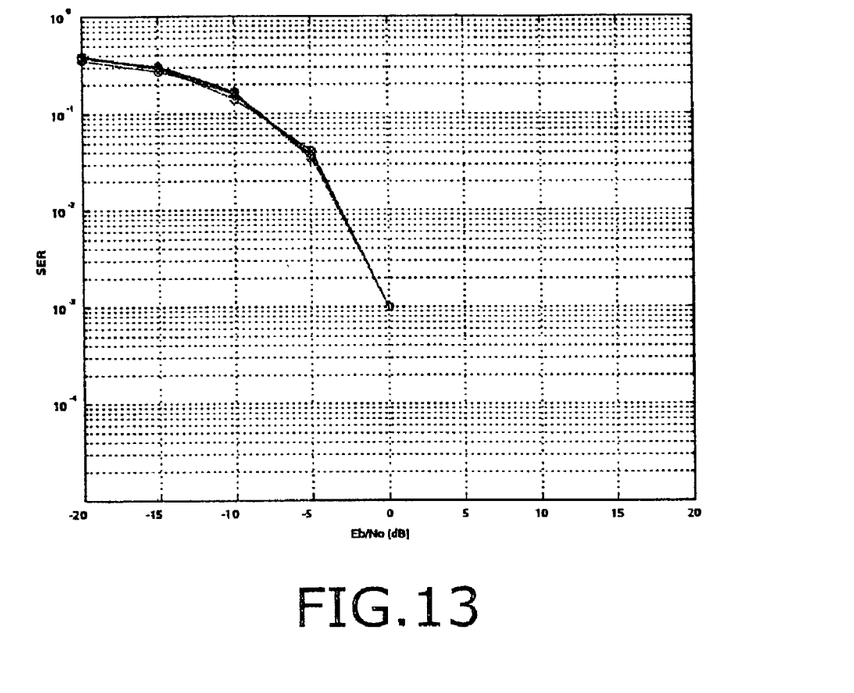
FIG. 13 is a graphical representation of when two different Hermite (orthogonal) pulses were assigned to each of four users.
Figure 14:
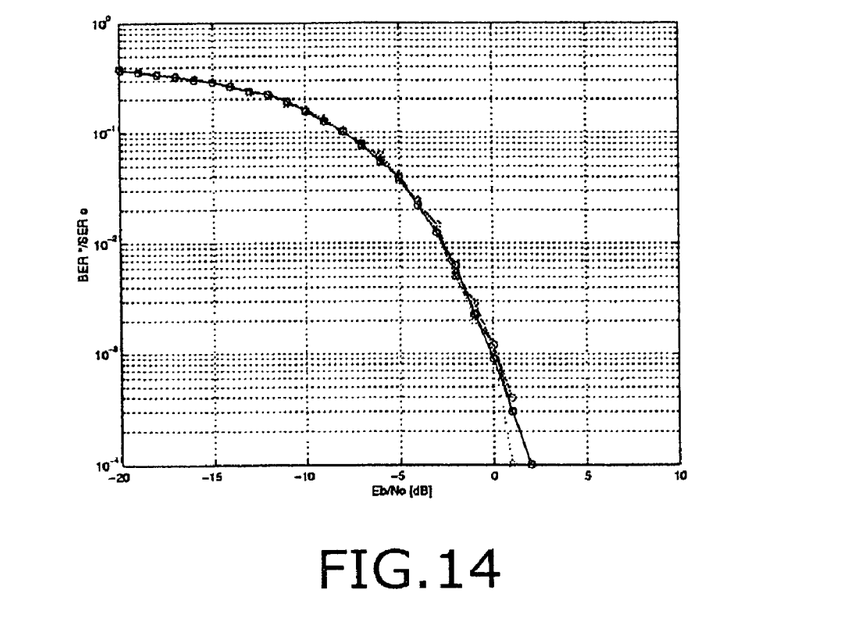
FIG. 14 is a graphical representation showing when two different Hermite (orthogonal) pulses were assigned to each user in the same manner as in FIG. 12, but pulses were transmitted at the same time.

FIG. 13 is a graphical representation of when two different Hermite (orthogonal) pulses were assigned to each of four users (a total of eight pulses). That is, order 1 and 2 pulses were assigned to a first user, order 3 and 4 pulses were assigned to a second user, order 5 and 6 pulses were assigned to a third user, and order 7 and 8 pulses were assigned to a fourth user. One pulse of each pulse set was transmitted at the same time as the others, so pulses were perfectly aligned as though sent from a single base station. Because the pulses are all orthogonal, they did not interfere with each other at reception, resulting in good reception performance. The performance is the same as the single user case shown in FIG. 14. In FIG. 14, two different Hermite (orthogonal) pulses were used to transmit to a single user. Four different cases are shown: pulses with order 1 and 2, 3 and 4, 5 and 6, and 7 and 8. Each pulse set produced the same results.

Figure 15:
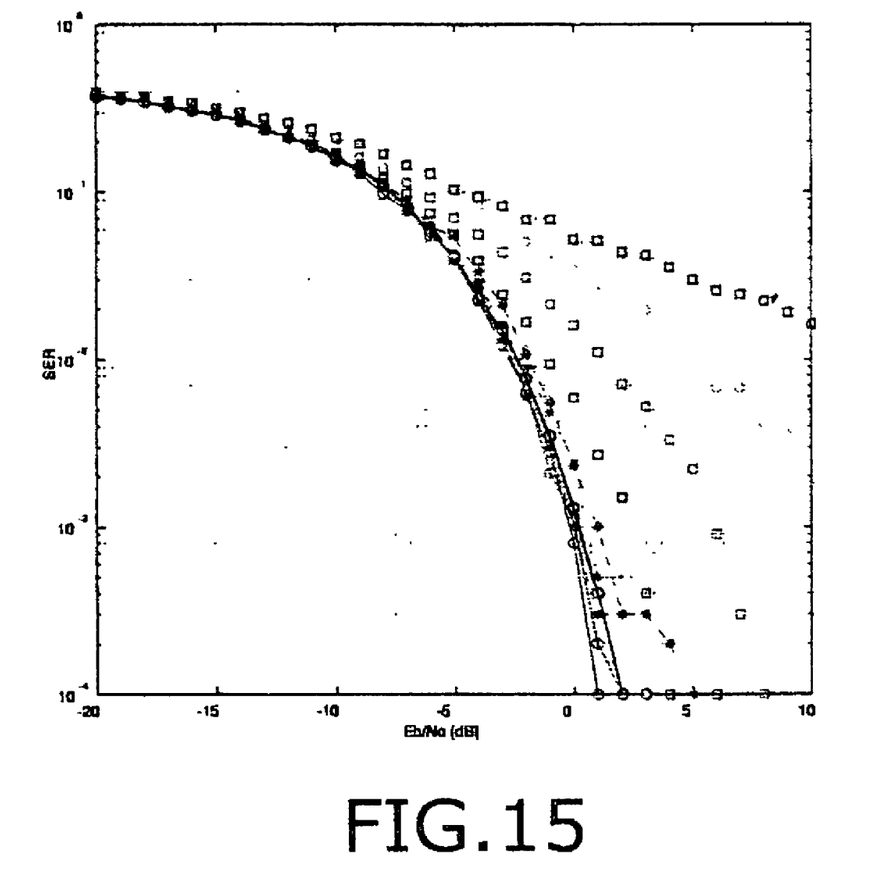
FIG. 15 is a graphical representation of the effects of adding uniformly distributed random timing jitter [−Δ, +Δ] between the transmitter and the receiver.

FIG. 15 is a graphical representation of the effects of adding uniformly distributed random timing jitter [−Δ, +Δ] between the transmitter and the receiver. The timing jitter was added in amounts of <1% (represented by circles), <2.5% (represented by asterisks) and <5% (represented by squares) of the pulse width. Percentage of pulse width was used because the pulse width can be quite variable for an UWB system depending on how broad the bandwidth that is required. By specifying percentage of pulse width, the same results were achieved, regardless of whether the absolute timing jitter is 10 ns or 0.1 ns, which in practice are quite different.

As can be seen in FIG. 15, when timing jitter is less than 2% of the pulse width, timing jitter has little influence, that is, less than 1 dB. However, when the timing jitter is greater than 5% of the pulse width, the timing jitter causes greater error rates, that is, 4 dB and higher, especially for higher orders of pulses. The reason for this increase is due to the larger number of oscillations seen in the higher pulse orders. This will impose a practical limit on the number of modified Hermite pulses that can be used in an actual communication system.

While the invention has been described in detail with reference to specific embodiments thereof, it would be apparent to those skilled in the art that various changes and modifications may be made therein without departing from the spirit of the invention, the scope of which is defined by the attached claims.

For example, although the embodiment describes the basic pulse supplier as generating the different pulse shapes, a memory that stores the different pulse shapes could be used instead as the supply of pulse shapes.

The embodiment describes the timing circuit controller 50 as providing pulse position modulation (PPM). However, the timing circuit controller 50 could provide pseudo-noise (PN) code division instead of or in addition to pulse position modulation (PPM).

Although the embodiment describes using modified Hermite pulses as the different pulse shapes, other different pulse shapes, such as orthogonal wavelet pulses, can be used. Any set of pulse shapes are sufficient as long as they have substantially the same pulse width.

What is claimed is:

1. A wireless impulse transmitter comprising:
    a transmission unit;
    a first pulse selector for selecting a first pulse shape or a second pulse shape, the first and second pulse shapes being assigned to a first receiver;
    a second pulse selector for selecting a third pulse shape or a fourth pulse shape, the third and fourth pulse shapes being assigned to a second receiver;
    a first pulse supplier for supplying the first or second pulse shape to the transmission unit;
    a second pulse supplier for supplying the third or fourth pulse shape to the transmission unit;
    wherein the transmission unit simultaneously transmits one of the first or second pulse shapes and one of the third or fourth pulse shapes wherein the first pulse shape is predefined as representing a first data symbol and the second pulse shape is predefined as representing a second data symbol;

wherein the third pulse shape is predefined as representing the first data symbol and the fourth pulse shape is predefined as representing the second data symbol;

wherein the first, second, third, and fourth pulse shapes are mutually orthogonal.

2. The wireless impulse transmitter as claimed in claim 1, wherein the first, second, third, and fourth pulse shapes have the same pulse width.

3. The wireless impulse transmitter as claimed in claim 1, wherein the first, second, third, and fourth pulse shapes are based on modified Hermite polynomials.

4. The wireless impulse transmitter as claimed in claim 3, wherein the first, second, third, and fourth pulse shapes are based on modified normalized Hermite polynomials.

5. A method comprising:

selecting a first pulse shape or a second pulse shape, the first and second pulse shapes being assigned to a first receiver;

selecting a third pulse shape or a fourth pulse shape, the third and fourth pulse shapes being assigned to a second receiver;

supplying the first or second pulse shape to a transmission unit supplying the third or fourth pulse shape to the transmission unit; and simultaneously transmitting one of the first or second pulse shapes and one of the third or fourth pulse shapes;

wherein the first pulse shape is predefined as representing a first data symbol and the second pulse shape is predefined as representing a second data symbol;

wherein the third pulse shape is predefined as representing the first data symbol and the fourth pulse shape is predefined as representing the second data symbol;

wherein the first, second, third, and fourth pulse shapes are mutually orthogonal.

6. The method as claimed in claim 5, wherein the first, second, third, and fourth pulse shapes have the same pulse width.

7. The method as claimed in claim 5, wherein the first, second, third, and fourth pulse shapes are based on modified Hermite polynomials.

8. The method as claimed in claim 7, wherein the first, second, third, and fourth pulse shapes are based on modified normalized Hermite polynomials.

9. The wireless impulse transmitter according to claim 1, wherein the first and third pulse shapes are predefined as representing a one and the second and fourth pulse shapes are predefined as representing a zero.

10. The method according to claim 5, wherein the first and third pulse shapes are predefined as representing a one and the second and fourth pulse shapes are predefined as representing a zero.

\* \* \* \* \*